Patented July 6, 1937

2,085,785

UNITED STATES PATENT OFFICE 2,085,785

PRODUCTION OF ALKYLAMINES

Robert Roger Bottoms, Louisville, Ky., assignor to The Girdler Corporation, Louisville, Ky., a corporation of Delaware No Drawing. Application June 18, 1935, Serial No. 27,207

14 Claims. (Cl. 260—127)

The present invention relates to the production of alkylamines, and it particularly relates to the process of preparing methylamines.

Methods of producing alkylamines by reacting together the corresponding alkyl chlorides with ammonia are expensive due to the necessity of forming the intermediate alkyl chlorides or other halides and also because of small yields and the difficulties of purification.

Among the objects of the present invention is to provide a process for the production of alkylamines and particularly for the production of methylamines with enhanced yields, with relatively inexpensive reagents, such as the corresponding aliphatic alcohol and ammonia, and without the necessity of employing vapor phase reactions requiring exacting control and expensive apparatus.

Another object is to provide an improved process for making dimethylamine by the direct interreaction between methyl alcohol and an ammonium salt.

Other objects will be obvious or will appear during the course of the following specification.

It has been found that alkylamines and particularly methylamines may be most readily prepared by reacting together methyl, ethyl, propyl, or the corresponding aliphatic alcohol with an ammonium salt, such as ammonium chloride or other ammonium halide in the presence of water and a catalyst to produce the desired alkylamines.

Among the preferred catalysts are chlorides or other halides of metals having atomic numbers ranging from 24 to 29 or having atomic weights from 52 to 63.57. For example, all of the metallic elements from chromium to copper within these ranges have been found to function satisfactorily as catalysts in the form of the chlorides or other halides. The preferred catalyst is iron chloride, preferably in the form of ferric chloride.

The amount of catalyst may be considerably varied and the metal halide may be used in amounts less than 1% (say $\frac{1}{10}$%) or a larger amount may be used. As an example of one method of producing methylamines according to the present invention, the following may be given:

The reaction between the alcohol and the ammonium chloride or other halide is preferably carried out with proportions about those which are necessary to form the secondary amine, since the secondary amine is the most desirable commercially, although the proportions may be varied to those approaching the proportions corresponding to those for the preparation of the primary or tertiary amines.

The reaction mixture is preferably placed in an autoclave or closed reaction vessel capable of withstanding high pressure and capable of enabling a relatively high temperature being applied, as for example, substantially above 200° and, if desired, up to 400°, with an optimum range between 275° and 325°.

The alkyl amines as prepared are usually in the form of their hydrochlorides or other hydrohalides, and consist of a mixture of primary, secondary and tertiary amines. In my application Serial No. 18,883, filed April 29, 1935, I have disclosed methods by which the primary, secondary and tertiary amines may be separated from each other.

However, other methods may be employed for separating the various primary, secondary and tertiary amines which may be preferred, and these methods of separation form no part of the present invention, which is primarily directed to producing the amines with high yields from the aliphatic alcohols.

I have found further that in the production of dimethylamine if the monomethylamine and trimethylamine produced in a batch are returned to a subsequent batch in the form of the hydrohalides, the presence of such primary and tertiary amine hydrohalides tends to set up an equilibrium in the reaction mixture and to prevent further production of primary and tertiary amines, and the yield of the secondary amines is thereby made practically theoretical based on the alcohol and ammonium halide which react.

*Example 1.*—640 grams (20 mols) methyl alcohol, 535 grams (10 mols) ammonium chloride, 400 cc. water, 5 grams of ferric chloride, and the hydrochlorides of monomethylamine and trimethylamine obtained from a previous run are placed in an autoclave and heated to 290°–300° for about 1½ hours, and the reaction mixture treated for the separation of the three methylamines.

About 95% of the ammonium chloride is thus converted to dimethylamine. About 5% of the ammonium chloride does not react, while a small portion of the methyl alcohol is converted to methyl ether.

The catalyst previously referred to promotes smooth reaction, hastens attainment of equilibrium and inhibits formation of ether.

*Example 2.*—920 grams (20 mols) ethyl alcohol, 535 grams (10 mols) ammonium chloride, 500 cc. water and 5 grams ferric chloride are placed in an autoclave and heated to 275°–280° for 2 hours. The autoclave is then cooled, and the reaction mixture neutralized and made alkaline by adding a 50% water solution of 1,000 grams sodium hydroxide. The excess alkali is not essential, but serves to "salt out" the free amine which is separated and distilled. Diethylamine in better than 80% yield results.

By changing the proportions of alcohol to ammonium chloride from a 2:1 ratio shown in Examples 1 and 2 to a ratio of 1:1, good yields of monoalkyl amines may be produced.

It is to be understood, of course, that according to the present invention, methyl alcohol, ethyl alcohol, propyl alcohol, isopropyl alcohol, butyl alcohol, isobutyl alcohol, and/or other aliphatic alcohols may be reacted with various ammonium halide salts, such as ammonium chloride, ammonium bromide, and so forth, in the presence of water and varying amounts of the metal chlorides or other halides, such as the chlorides or other halides of chromium, manganese, iron, cobalt, nickel and copper, to produce the desired amines.

Having thus described my invention, what I claim as new and desire to secure by Letters Patent is:—

1. A process of making alkylamines, which comprises reacting a lower alkanol with an ammonium halide in the presence of added water and of a halide of a metal having an atomic number between 24 and 29 as a catalyst.

2. A process of making methylamines, which comprises reacting methanol with an ammonium halide in the presence of added water and of ferric chloride.

3. A process of making methylamines, which comprises reacting methanol with an ammonium halide in the presence of added water and of a chloride of a metal having an atomic number between 24 and 29 as a catalyst, at a temperature of between 250° to 350° C. and at least such pressure as results from heating said mixture to said temperature in an autoclave.

4. A process of making methylamines, which comprises reacting methanol with an ammonium halide in the presence of added water and of ferric chloride at about 290° C. in an autoclave for two hours.

5. A process for making dimethylamine, which comprises reacting 1 mol. of ammonium chloride with 2 mols of methyl alcohol in the presence of added water and a halide of a metal having an atomic number between 24 and 29.

6. A process of making ethylamines, which comprises reacting ethanol with an ammonium halide in the presence of added water and of a halide of a metal having an atomic number between 24 and 29.

7. A process of making alkylamines, which comprises reacting a lower alkanol with an ammonium halide in the presence of added water and of a chloride of a metal having an atomic number between 24 and 29 as a catalyst, at a temperature of between 250° and 350° C. in an autoclave, and then separating the primary, secondary and tertiary amines so produced.

8. A process of making alkylamines, which comprises reacting a lower alkanol with an ammonium halide in the presence of added water and of $\frac{1}{10}$ to 15% of a chloride of a metal having an atomic number between 24 and 29 as a catalyst.

9. A process of making alkylamines, which comprises reacting a lower alkanol with an ammonium halide in the presence of added water and of $\frac{1}{10}$ to 15% of ferric chloride.

10. A process of making alkylamines, which comprises reacting a lower alkanol with an ammonium halide in the presence of added water and of a chloride of a metal having an atomic number between 24 and 29 as a catalyst, at a temperature of about 290° C., in an autoclave, and then separating the alkylamines by distillation.

11. A process of making ethylamines, which comprises reacting ethanol with an ammonium halide in the presence of added water of ferric chloride at 250° to 350° C. in an autoclave for two hours.

12. A process of making diethylamines, which comprises reacting 1 mol. of ammonium chloride with 2 mols of ethyl alcohol in the presence of added water and of a halide of a metal having a molecular weight between 52 and 64.

13. A process of making alkylamines, which comprises reacting a lower alkanol with an ammonium halide in the presence of added water and of ferric chloride at 250° to 350° C. in an autoclave for two hours.

14. A process of making dialkylamines, which comprises reacting 1 mol. of ammonium chloride with 2 mols of a lower alkanol in the presence of added water and of a halide of a metal having a molecular weight between 52 and 64.

ROBERT ROGER BOTTOMS.